United States Patent
Choi et al.

(10) Patent No.: US 12,327,379 B2
(45) Date of Patent: Jun. 10, 2025

(54) APPARATUS AND METHOD FOR CALIBRATION BETWEEN WIDE ANGLE-NARROW ANGLE LENSES THROUGH DUAL-ChArUco BOARD

(71) Applicant: ELECTRONICS AND TELECOMMUNICATIONS RESEARCH INSTITUTE, Daejeon (KR)

(72) Inventors: Joong Yong Choi, Sejong-si (KR); Hyun Joo Kim, Daejeon (KR); Ah Reum Oh, Daejeon (KR); Hyung Keun Jee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 111 days.

(21) Appl. No.: 18/343,566

(22) Filed: Jun. 28, 2023

(65) Prior Publication Data

US 2024/0185459 A1 Jun. 6, 2024

(30) Foreign Application Priority Data

Dec. 2, 2022 (KR) .................. 10-2022-0166986

(51) Int. Cl.
| | | |
|---|---|---|
| *G06T 7/80* | (2017.01) | |
| *G06T 7/70* | (2017.01) | |
| *G06V 10/44* | (2022.01) | |
| *G06V 10/70* | (2022.01) | |
| *H04N 17/00* | (2006.01) | |

(52) U.S. Cl.
CPC .................. *G06T 7/80* (2017.01); *G06T 7/70* (2017.01); *G06V 10/70* (2022.01); *G06V 10/44* (2022.01); *H04N 17/002* (2013.01)

(58) Field of Classification Search
CPC .......... G06T 7/70; G06T 7/80; H04N 17/002; G06V 10/70; G06V 10/44
See application file for complete search history.

(56) References Cited

U.S. PATENT DOCUMENTS

| | | | |
|---|---|---|---|
| 6,734,911 B1 * | 5/2004 | Lyons ..................... | G01S 3/781 348/340 |
| 10,664,998 B2 * | 5/2020 | Wakai ....................... | G06T 7/85 |
| 10,666,929 B2 * | 5/2020 | Bradski ................. | G06T 1/0007 |
| 10,726,528 B2 * | 7/2020 | Ozaki ....................... | G06T 5/70 |

(Continued)

FOREIGN PATENT DOCUMENTS

| | | |
|---|---|---|
| KR | 10-2021-0116161 A | 9/2021 |
| KR | 10-2022-0085693 A | 6/2022 |

OTHER PUBLICATIONS

Sang Ha Lee et al., "Extrinsic Parameter Calibration Using ChArUco Board," DBpia, 2019.

*Primary Examiner* — Brian P Yenke (57) ABSTRACT

An apparatus and method for calibration between wide angle-narrow angle lenses through a dual-ChArUco board is disclosed. A method of calibration between wide angle-narrow angle lenses through a dual-ChArUco board includes recognizing a first pattern through a wide-angle lens of a first sensor and recognizing a second pattern through a narrow-angle lens of a second sensor, storing the first pattern and the second pattern; and calibrating the stored first pattern and the stored second pattern.

16 Claims, 9 Drawing Sheets

(56) References Cited

U.S. PATENT DOCUMENTS

| | | | | |
|---|---|---|---|---|
| 11,348,281 | B1* | 5/2022 | Tang | H04N 13/246 |
| 11,587,259 | B2* | 2/2023 | Tang | G06T 7/80 |
| 12,140,855 | B2* | 11/2024 | Lablans | G03B 37/04 |
| 2002/0003965 | A1* | 1/2002 | Landelle | H04N 23/663 |
| | | | | 348/E17.002 |
| 2009/0147245 | A1* | 6/2009 | Yuan | G01M 11/0221 |
| | | | | 356/124 |
| 2012/0154543 | A1* | 6/2012 | Kasuga | H04N 13/356 |
| | | | | 348/47 |
| 2013/0083168 | A1* | 4/2013 | Kim | G03B 43/00 |
| | | | | 348/E13.016 |
| 2013/0120538 | A1* | 5/2013 | Shin | H04N 13/25 |
| | | | | 348/47 |
| 2013/0258115 | A1* | 10/2013 | Hansson | H04N 23/58 |
| | | | | 348/187 |
| 2014/0098195 | A1* | 4/2014 | Pace | H04N 13/243 |
| | | | | 348/47 |
| 2014/0098198 | A1* | 4/2014 | Lee | G06F 3/013 |
| | | | | 348/48 |
| 2014/0104393 | A1* | 4/2014 | Oho | H04N 13/246 |
| | | | | 348/46 |
| 2014/0118557 | A1 | 5/2014 | Lee et al. | |
| 2014/0334675 | A1* | 11/2014 | Chu | G06T 7/73 |
| | | | | 382/103 |
| 2017/0098305 | A1* | 4/2017 | Gossow | G06T 15/06 |
| 2018/0352158 | A1* | 12/2018 | Sugaya | H04N 23/50 |
| 2020/0288102 | A1* | 9/2020 | Um | G06T 15/10 |
| 2021/0082086 | A1* | 3/2021 | Bichu | G06T 5/80 |
| 2021/0174547 | A1 | 6/2021 | Park et al. | |
| 2021/0190922 | A1* | 6/2021 | Yu | G01S 17/86 |
| 2022/0044441 | A1* | 2/2022 | Kalra | G06V 10/82 |
| 2022/0148225 | A1* | 5/2022 | Myokan | H04N 25/61 |
| 2022/0189062 | A1 | 6/2022 | Seo et al. | |
| 2022/0358679 | A1* | 11/2022 | Chen | G06T 7/73 |
| 2022/0394183 | A1* | 12/2022 | Nagai | H04N 23/695 |
| 2023/0016057 | A1* | 1/2023 | Kim | G06T 15/506 |
| 2023/0090757 | A1* | 3/2023 | Chen | G06T 7/0008 |
| | | | | 382/103 |
| 2024/0371038 | A1* | 11/2024 | Zhang | G06T 7/85 |
| 2024/0398229 | A1* | 12/2024 | Mehndiratta | G06T 7/73 |

* cited by examiner

```
read calib/image0_00.jpg calib/image1_00.jpg
read calib/image0_01.jpg calib/image1_01.jpg
read calib/image0_02.jpg calib/image1_02.jpg
read calib/image0_03.jpg calib/image1_03.jpg
read calib/image0_04.jpg calib/image1_04.jpg
read calib/image0_05.jpg calib/image1_05.jpg
read calib/image0_06.jpg calib/image1_06.jpg
read calib/image0_07.jpg calib/image1_07.jpg
read calib/image0_08jpg calib/image1_08.jpg START - intrinsic calibration...
FINISHED - intrinsic calibration...
Image0 : Re-projection error : 0.09264125178257625
Image1 : Re-projection error : 0.15114338944355646

START - extrinsic calibration...
[[ 0.9996   0.0026   0.0267  39.5719]
 [-0.0026  1.       0.0009  88.8627]
 [-0.0267 -0.001    0.9996  86.3825]
 [ 0.      0.       0.       1.    ]]
```

| +0.9996 | 0.0026  | 0.0267 | 39.5719 |
| -0.0026 | 1.0000  | 0.0009 | 88.8627 |
| -0.0267 | -0.0010 | 0.9996 | 86.3825 |
| +0.0000 | 0.0000  | 0.0000 | 1.0000  |

APPARATUS AND METHOD FOR CALIBRATION BETWEEN WIDE ANGLE-NARROW ANGLE LENSES THROUGH DUAL-ChArUco BOARD

CROSS-REFERENCE TO RELATED APPLICATION

The present application claims priority to Korean Patent Application No. 10-2022-0166986, filed on Dec. 2, 2022 in the Korea Intellectual Property Office, the entire contents of which are incorporated herein by reference.

TECHNICAL FIELD

The present disclosure relates to an apparatus and method for calibration between wide angle-narrow angle lenses through a dual-ChArUco board.

BACKGROUND

Digitalization work for archival records and universal dissemination of cultural heritage has been underway for many years under the leadership of the Cultural Heritage Administration. In this case, cultural properties are digitized into 3D data through photogrammetry and 3-dimensional (3D) scanning.

The 3D scanning method requires the use of expensive equipment called a 3D scanner, and it is difficult to obtain high-resolution 3D data only through photogrammetry. Therefore, research on obtaining 3D data by additionally utilizing a sensor as well as the existing photogrammetry method is being conducted.

In order to acquire cultural property data by adding the sensor to an existing photogrammetry method, a high-resolution camera (e.g., a digital single-lens reflex (DSLR) camera), a position sensor, a depth sensor, etc., are required. The position sensor serves to record capturing time information. The depth sensor serves to acquire distance information from the camera to a cultural object to be captured.

Calibration is required to know the positional relationship between these heterogeneous sensors. When each heterogeneous sensor has a camera module, calibration using this image is possible. Generally, when calibrating the positional relationship between two sensors based on an image, a single checkerboard is captured and calculated.

In general, a 50 mm standard prime lens is used to capture cultural property data in high resolution. However, when a Realsense T265 (hereinafter, referred to as a 'T265 camera') is used as a position sensor camera for recording the capturing time information, the T265 camera uses a fisheye lens. The fisheye lens detects changes by recognizing more surrounding objects. Therefore, when using the T265 camera, it is difficult to capture a single checkerboard on one screen.

More specifically, since the DSLR camera has a narrow viewing angle and the T265 camera has a wide viewing angle, when a checkerboard pattern for calibration is matched to the viewing angle of the DSLR camera, the pattern appears too small in the T265 camera, resulting in poor accuracy. Conversely, when the checkerboard pattern is matched to the T265 camera, the calibration may not be performed since the viewing angle is out of range and the entire pattern is not visible in the DSLR camera.

SUMMARY

In view of the above, the present disclosure provides an apparatus and a method for calibration between wide angle-narrow angle lenses through a dual-ChArUco board.

More specifically, the present disclosure provides an apparatus and a method for more precisely performing calibration between heterogeneous sensors having a large difference in viewing angles.

Objects of the present disclosure are not limited to the above-mentioned object, and other objects and advantages of the present disclosure that are not mentioned may be understood by the following description and will be more clearly appreciated by exemplary embodiments of the present disclosure.

In addition, it may be easily appreciated that objects and advantages of the present disclosure may be realized by means mentioned in the claims and a combination thereof.

According to an embodiment of the present disclosure, a method of calibration between wide angle-narrow angle lenses through a dual-ChArUco board includes recognizing a first pattern through a wide-angle lens of a first sensor and recognizing a second pattern through a narrow-angle lens of a second sensor; storing the first pattern and the second pattern; and calibrating the stored first pattern and the stored second pattern.

According to an embodiment of the present disclosure, an apparatus for calibration between wide angle-narrow angle lenses through a dual-ChArUco board includes a data acquisition unit configured to recognize a first pattern through a wide-angle lens of a first sensor and recognize a second pattern through a narrow-angle lens of a second sensor; a storage unit configured to store the first pattern and the second pattern; and a calibration unit configured to calibrate the stored first pattern and the stored second pattern.

According to the present disclosure, it is possible to more precisely perform calibration between heterogeneous sensors having a large difference in viewing angles.

According to the present disclosure, it is possible to reduce calibration errors between heterogeneous sensors including lenses having a large difference in viewing angles.

DETAILED DESCRIPTION

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

The following detailed description is intended to describe exemplary embodiments of the present invention and is not intended to represent the only embodiments in which the present invention may be practiced.

The present disclosure relates to an apparatus and a method for calibration between wide angle-narrow angle lenses through a dual-ChArUco board, and provides an apparatus and a method for reducing calibration errors between heterogeneous sensors including lenses having a large difference in viewing angles.

Figure 1:
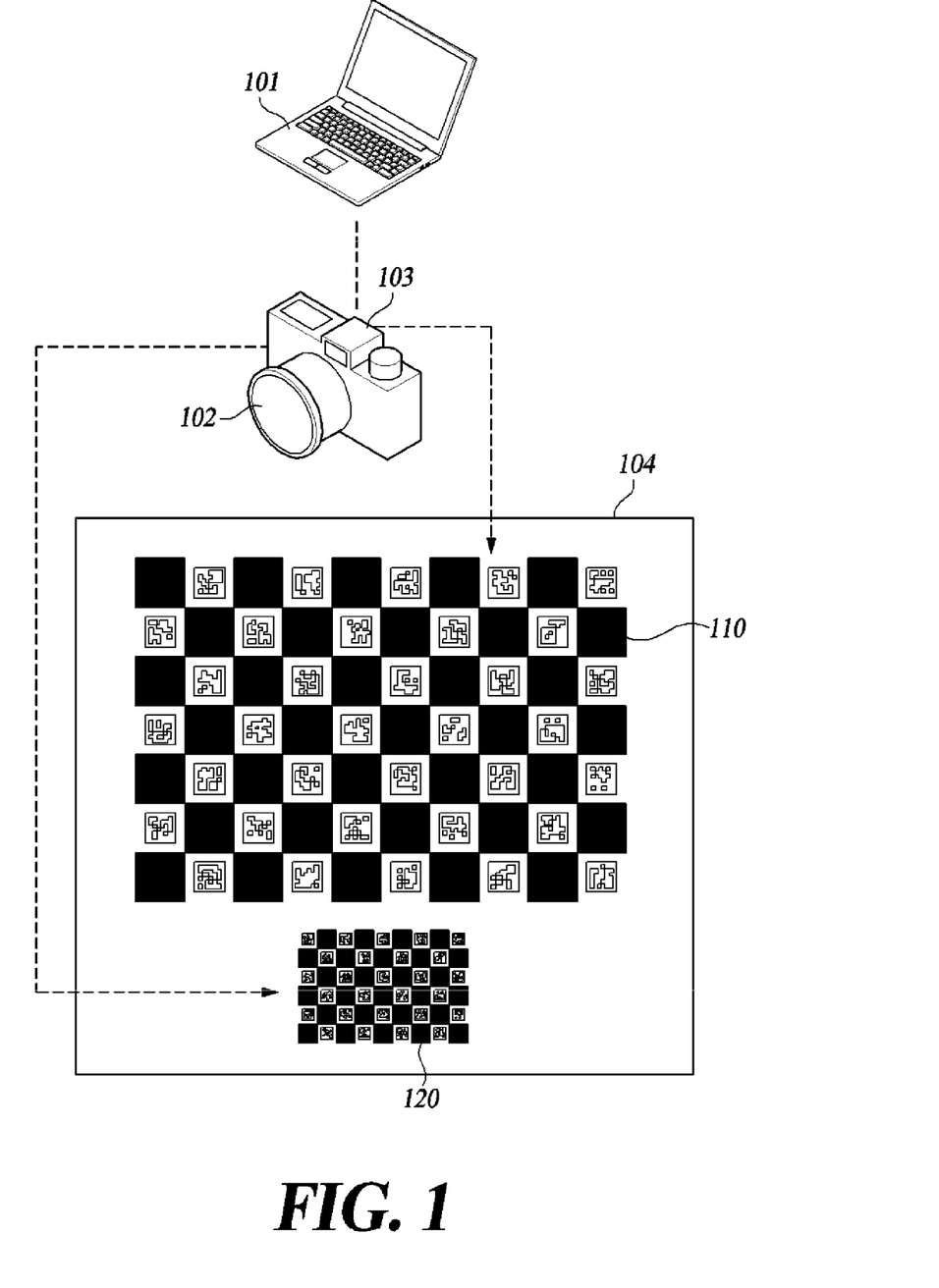
FIG. 1 is a configuration diagram of an apparatus for calibration between wide angle-narrow angle lenses through a dual-ChArUco board according to an embodiment of the present disclosure.

FIG. 1 is a configuration diagram of an apparatus for calibration between wide angle-narrow angle lenses through a dual-ChArUco board according to an embodiment of the present disclosure.

A heterogeneous sensor-based acquisition device for acquiring cultural property as 3D data according to an embodiment of the present disclosure is configured to include a DSLR camera 102 for acquiring a high-resolution image, a position sensor 103 for determining a position movement and angle of the camera at each capturing time, a dual-ChArUco board 104 for performing precise calibration, a notebook computer 101 for simultaneously acquiring images of heterogeneous sensors (position sensor 103-DSLR 102) and performing calibration, etc. The notebook computer is a camera calibration device (device for calibration between wide angle-narrow angle lenses through the dual-ChArUco board 104), and the camera calibration device may include a personal computer (PC), a tablet, a smartphone, etc. in addition to a notebook computer.

In this case, the DSLR camera 102 for acquiring a high-resolution image uses a 50 mm standard prime lens in an EOS R5 camera, for example, and the position sensor 103 for acquiring the position and angle in 3D space at the capturing time, for example, used Intel Realsense T265. The image of the DSLR camera 102 and the image of the position sensor 103 may be composed of two different patterns 110 and 120 on one calibration board 104.

Figure 2:
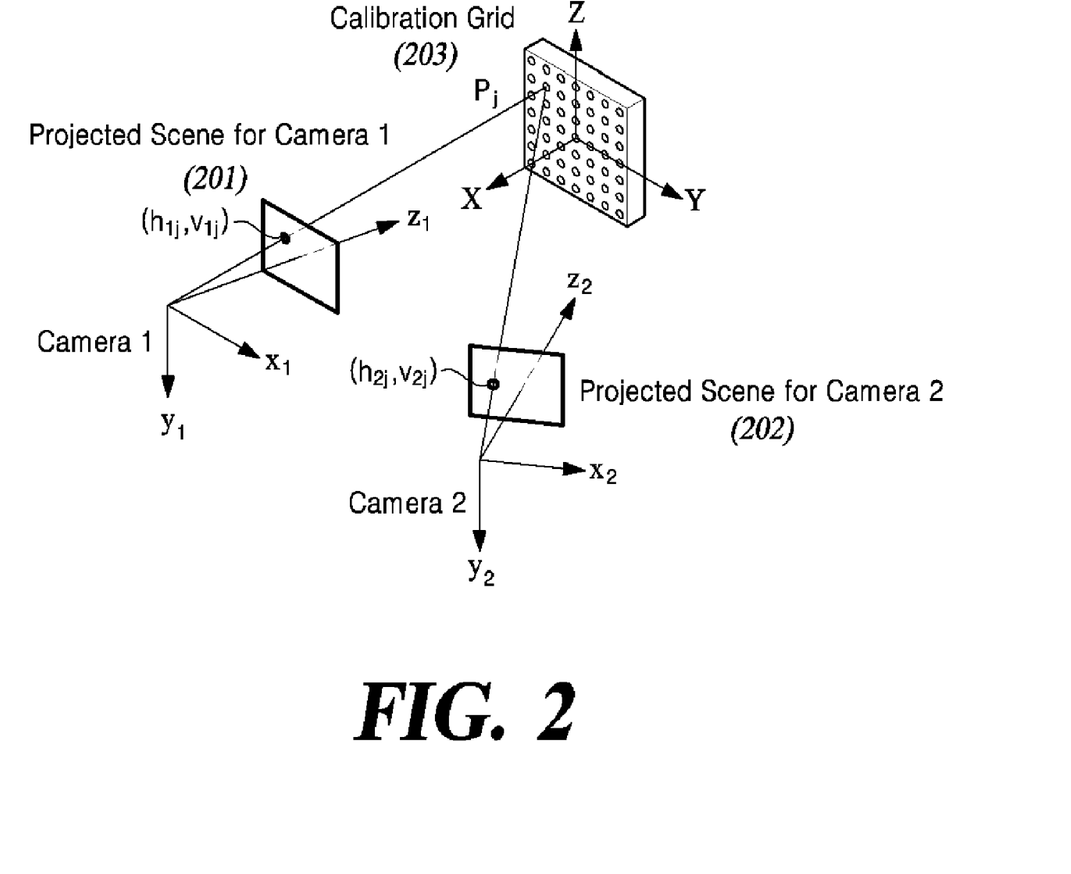
FIG. 2 is a general calibration conceptual diagram according to an embodiment of the present disclosure.

FIG. 2 is a general calibration conceptual diagram.

The purpose of the calibration is to determine the position between heterogeneous sensors. The position of the heterogeneous sensor is a position of a camera focus inside the sensor, and may not be easily identified by physical measurement. Therefore, the position of the sensor is determined using the image.

In order to determine the position between the heterogeneous sensors, first, several pictures of a checkerboard 203 are taken at various positions with the two heterogeneous sensors 201 and 202. In this case, the images should be captured at the same time to be synchronized. By analyzing the captured image, it is possible to know the positional relationship between the sensors. The checkerboard 203 is composed of a plurality of grids. The plurality of grids may have a square shape of the same size.

Figure 3:
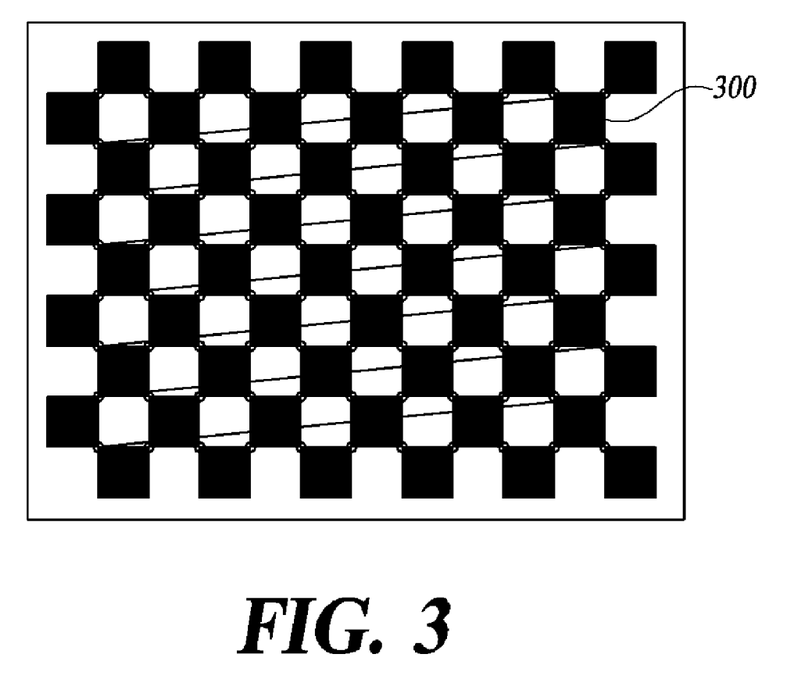
FIG. 3 is an exemplary view of performing calibration through a single checkerboard according to an embodiment of the present disclosure.

FIG. 3 is an exemplary view of performing calibration through a single checkerboard according to an embodiment of the present disclosure.

The DSLR camera 102 and the position sensor 103 simultaneously capture the checkerboard 300 at different angles and recognize corner points of the checkerboard based on the collected images.

The number of corner points of the checkerboard and the size of the pattern need to be set in advance. In the example of FIG. 3, for example, a size of 11×8 and square_size_in_mm=60 each were used. The number of checkerboard patterns needs to be accurately input in order for no problems to occurs when calculating the calibration value.

When the calibration has been performed, a reprojection error and a calibrated result value are finally calculated. The calibrated result value is output as a transform matrix from a reference image coordinate system to a relative image coordinate system.

Figure 4:
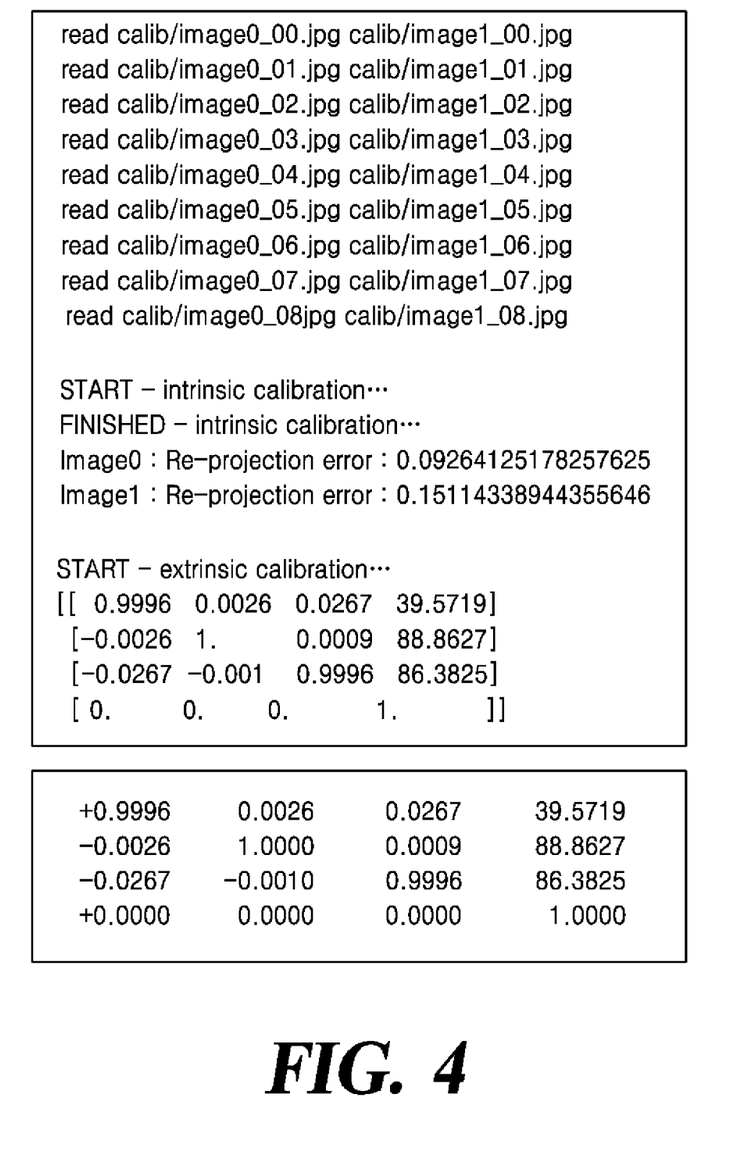
FIG. 4 is an exemplary diagram illustrating a result of performing calibration according to an embodiment of the present disclosure.

FIG. 4 is an exemplary diagram illustrating a result of performing calibration according to an embodiment of the present disclosure.

That is, FIG. 4 is an exemplary view showing the result value of the calibration performed in FIG. 3. In this case, the calibration result value is the transform matrix of the relative coordinate system of the DSLR calculated based on the image collected through the fisheye lens of the position sensor 103.

In the 4×4 transform matrix, (0, 0) to (2, 2) represents rotation, and (0, 3), (1, 3), (2, 3) are t (translation) values, which mean a differences in x, y, and z axes respectively. Here, the values according to FIG. 4 corresponding to (0, 3), (1, 3), and (2, 3) are 39.5719, 88.8627, and 86.3825, which correspond to $t_x$, $t_y$, and $t_z$, respectively.

Figure 5:
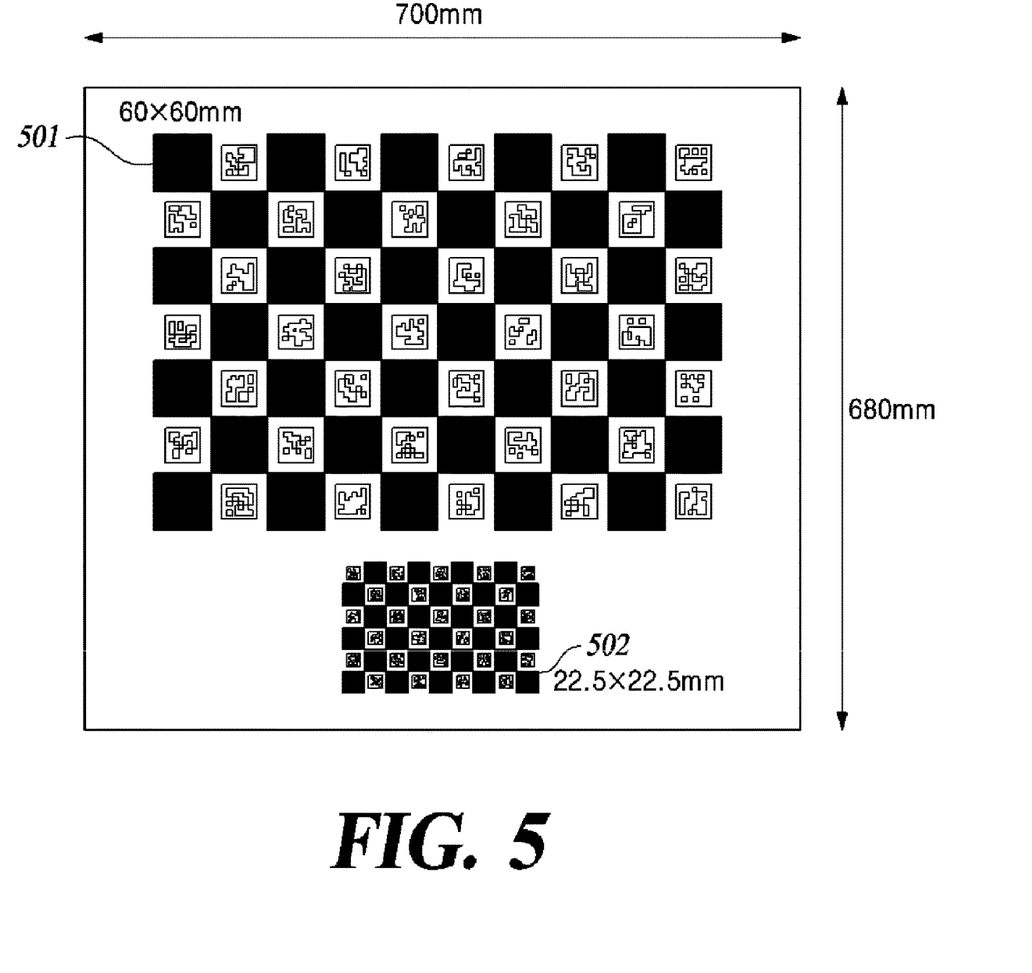
FIG. 5 is an exemplary diagram illustrating a dual-ChArUco board for calibrating a heterogeneous sensor having a large difference in viewing angles according to an embodiment of the present disclosure.

FIG. 5 is an exemplary diagram illustrating a dual-ChArUco board for calibrating a heterogeneous sensor having a large difference in viewing angles according to an embodiment of the present disclosure.

In an embodiment of the present disclosure, a method of printing two different patterns on one calibration board was used so that each calibration pattern may be obtained from lenses having different viewing angles. FIG. 5 shows a calibration board (dual-ChArUco board) for heterogeneous sensors having different viewing angles.

Referring to FIG. 5, a large calibration pattern (e.g., 9×6) for a T265 camera, which is a position sensor, is printed on a top 501, and a small calibration pattern (e.g., 8×5) for a DSLR camera is printed on a bottom 502. Each camera may be calibrated using a distinguished ChArUco board pattern.

Figure 6:
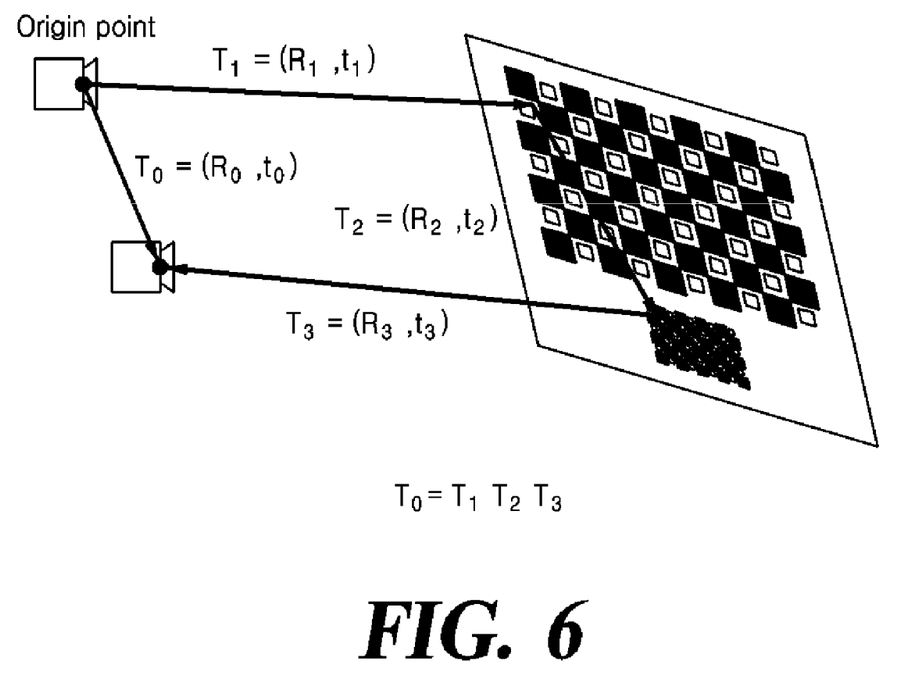
FIG. 6 is an exemplary view illustrating a calibration process between heterogeneous sensors having different viewing angles according to an embodiment of the present disclosure.

FIG. 6 is an exemplary view illustrating a calibration process between heterogeneous sensors having different viewing angles according to an embodiment of the present disclosure.

For heterogeneous sensors having different viewing angles, calibration patterns having different sizes are used because the same calibration pattern may not be found in both cameras at the same time. A box on the right of FIG. 6 shows an example in which calibration patterns having two different patterns and different sizes are used on one calibration board.

Also, FIG. 6 illustrates a process of how to find a positional relationship between two cameras using two calibration patterns.

Basically, since the positional relationship between the camera and the calibration pattern may be found by using the calibration pattern, the positional relationships $T_1$, and $T_3$ from each camera to each calibration pattern may be found using two calibration patterns. In addition, since the positional relationship $T_2$ between the two calibration patterns is known in advance, a positional relationship $T_0$ between the two camera sensors may be known by using $T_1$, $T_2$, and $T_3$. The execution order is as follows.

[Execution Order]

① $T_1=(R_1, t_1)$: May be calculated using the solvePnP( ) function in the checkerboard image (the large checkerboard at the top of the box on the right side of FIG. 6).

② $T_2=(R_2, t_2)$: The positional relationship between the two checkerboards is fixed as a constant value.

③ $T_3=(R_3, t_3)$: May be calculated using the solvePnP( ) function in the checkerboard image (the small checkerboard at the bottom of the box on the right side of FIG. 6). However, since output value of the solvePnP( ) function is based on the camera, an inverse matrix needs to be used.

④ $T_0=T_1T_2T_3$ is calculated to find the positional relationship between the two camera sensors.

In this case, the execution order of processes (1, 2, and 3) may be changed without an issue.

Figure 7:
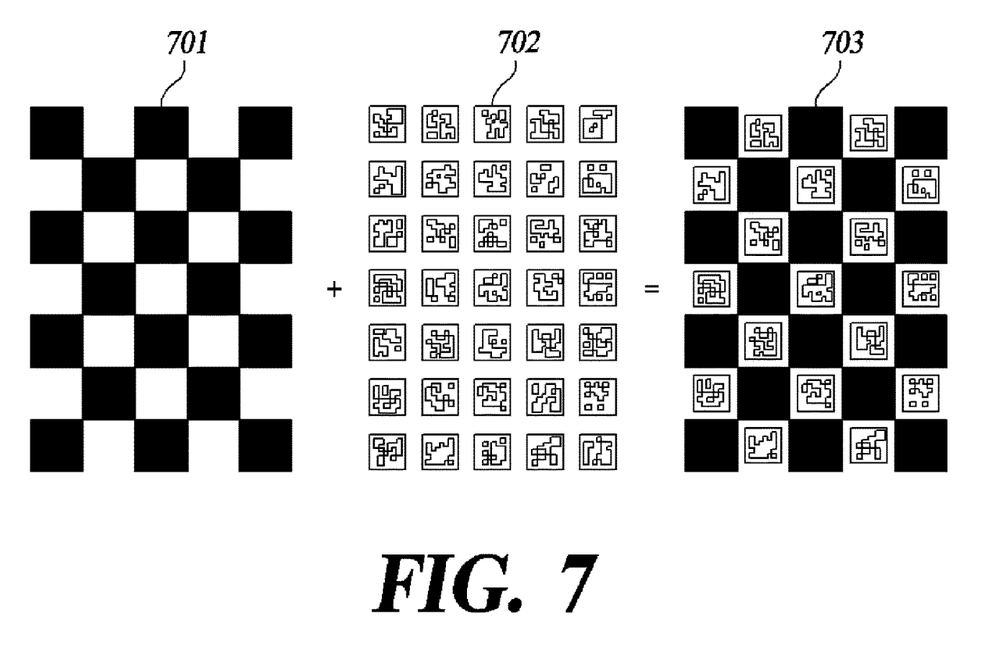
FIG. 7 is an exemplary diagram illustrating a ChArUco board used in a dual-ChArUco board according to an embodiment of the present disclosure.

FIG. 7 is an exemplary diagram illustrating a ChArUco board used in a dual-ChArUco board according to an embodiment of the present disclosure.

In the present disclosure, a ChArUco board, rather than a general checkerboard (chess board), was used as a pattern object to be recognized by each camera of the heterogeneous sensor. When calibrating using a single checkerboard, only the preset number of corner points needs to be included on one screen, but in order to recognize each pattern of a size optimized for heterogeneous sensor cameras having different viewing angles, since the pattern to be recognized by the position sensor and the pattern to be recognized by the DSLR camera need to be distinguishable, it can't be composed of only the checkerboards having the same shape.

Therefore, in the embodiment of the present disclosure, a ChArUco board 703, which is a combination of an ArUco marker 702 and a checker board 701, is used to distinguish the patterns to be recognized by the position sensor and the DSLR camera. The ChArUco board 703 has an ID assigned to each corner so a corner may be found more accurately than a chess board and the ChArUco board has a unique coordinate system regardless of the camera position.

Since the Aruco marker 702 has an identification number for each marker, even if only some markers are included in the camera screen, it is possible to distinguish for which camera the patterns including the marker are for. However, when the pattern is formed only with the Arco marker 702, the accuracy of the corner point position is not high.

Conversely, the corners of the chessboard pattern may be trimmed more precisely because each corner is surrounded by two black squares. Therefore, in the embodiment of the present disclosure, the ChArUco board 703 including both the advantages of the Arco marker 702 and the advantages of the checker board 701 is utilized.

Figure 8:
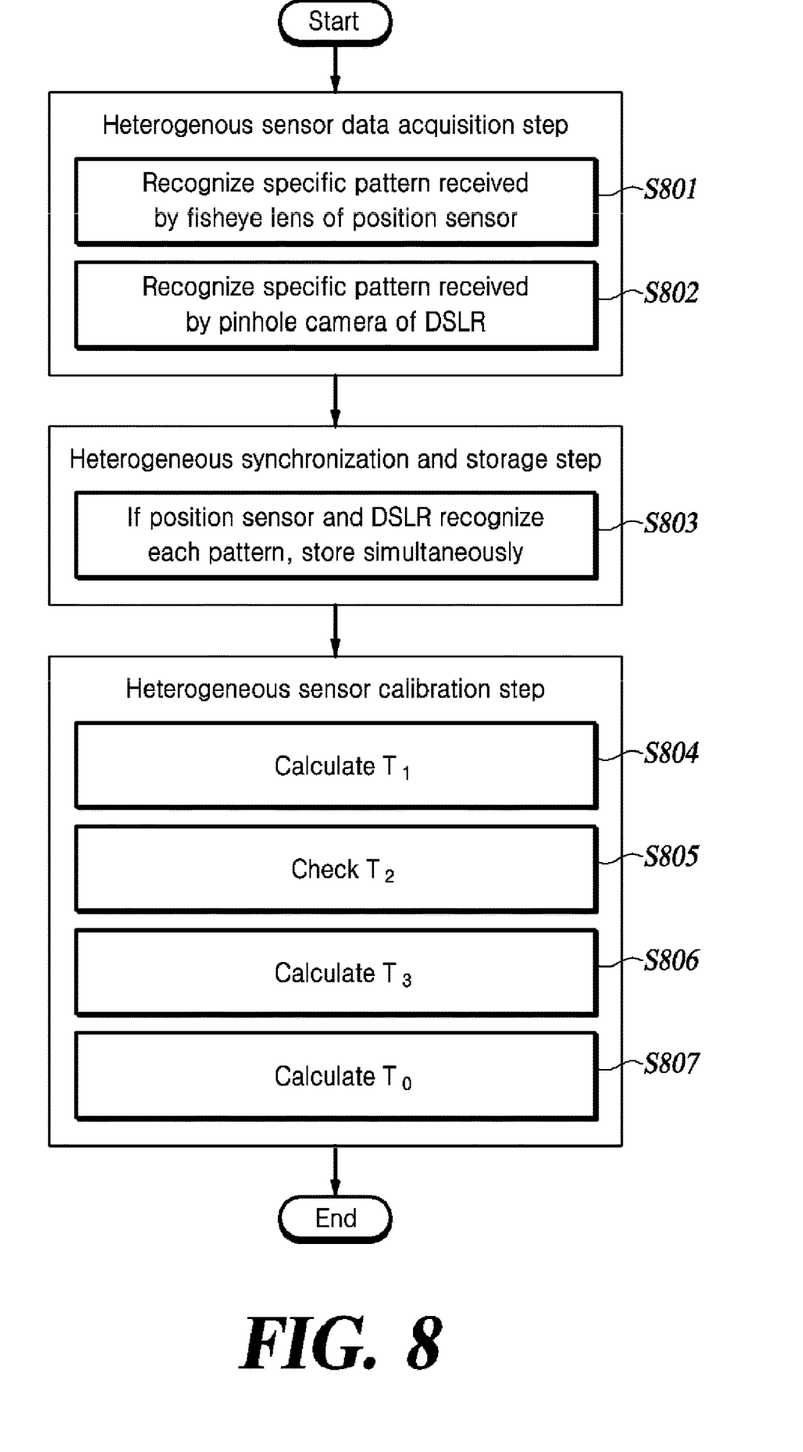
FIG. 8 is a flowchart of a method of calibration between wide angle-narrow angle lenses through a dual-ChArUco board according to an embodiment of the present disclosure.

FIG. 8 is a flowchart of a method of calibration between wide angle-narrow angle lenses through a dual-ChArUco board according to an embodiment of the present disclosure.

The process of calibration between wide angle-narrow angle lenses through the dual-ChArUco board according to an embodiment of the present disclosure largely performed as a heterogeneous sensor data acquisition step, a heterogeneous sensor synchronization and storage step, and a heterogeneous sensor calibration step.

The heterogeneous sensor data acquisition step includes a step of recognizing a specific pattern received by a fisheye lens camera of the position sensor (step 801) and a step of recognizing a specific pattern received by a pinhole camera of the DSLR (step 802). The specific patterns recognized in these two steps refer to an upper ChArUco board pattern and a lower ChArUco board pattern of the dual-ChArUco board, respectively. In this case, the patterns used are determined based on predefined identification markers, the number of checker corner points, size, etc., as illustrated in FIGS. 5 and 7. Step 802 may proceed before step 801.

In the heterogeneous sensor synchronization and storage step, after confirming whether the position sensor and the DSLR camera recognize each pattern through two detailed steps of the heterogeneous sensor data acquisition step, images of the two sensors and the camera are stored (step 803).

In the heterogeneous sensor calibration step, a total of four steps are performed.

First, a step of calculating the positional relationship $T_1$ from the position sensor to the ChArUco board pattern is performed using the solvePnP( ) function through the stored large ChArUco board image (step 804).

Second, since the positional relationship $T_2$ between the large ChArUco board and the small ChArUco board of the dual-ChArUco board is a fixed value known in advance, the positional relationship $T_2$ is stored in memory for future use (step 805).

Third, a step of calculating the positional relationship $T_3$ from the DSLR camera to the ChArUco board pattern is performed using the solvePnP( ) function through the stored small ChArUco board image (step 806).

In this case, the execution order of steps 804, 805, and 806 may be changed without an issue.

Fourth, the positional relationship $T_0$ from the position sensor to the DSLR camera is calculated using the inverse matrix of $T_1$, $T_2$, and $T_3$, which are the resulting values of the steps performed above (step 807).

Through the process of FIG. 8, according to the present disclosure, the calibration between heterogeneous sensors having a large difference in viewing angles may be performed more precisely.

Figure 9:
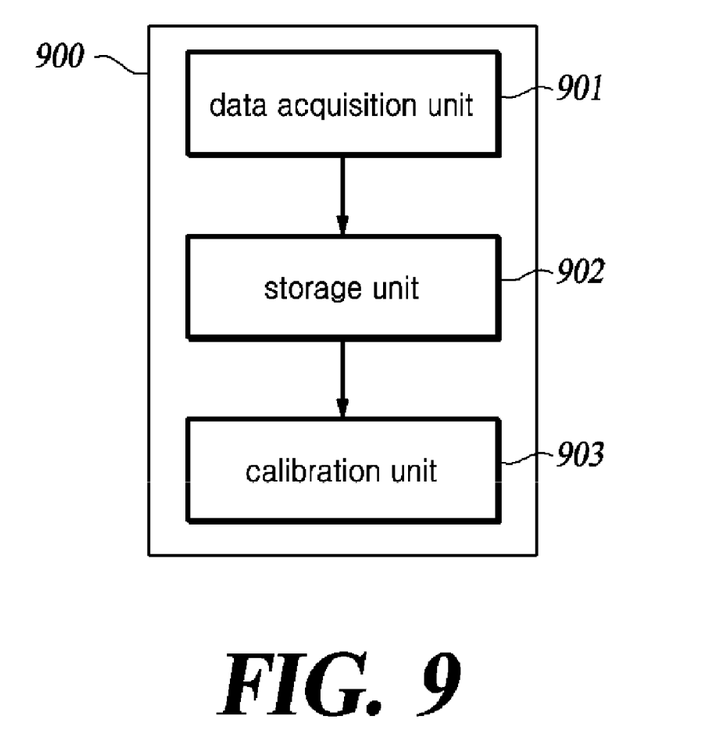
FIG. 9 is a block configuration diagram of an apparatus for calibration between wide angle-narrow angle lenses through a dual-ChArUco board according to an embodiment of the present disclosure.

FIG. 9 is a block configuration diagram of an apparatus for calibration between wide angle-narrow angle lenses through a dual-ChArUco board according to an embodiment of the present disclosure.

Referring to FIG. 9, an apparatus 900 for calibration between wide angle-narrow angle lenses through a dual-ChArUco board according to an embodiment of the present disclosure may be configured to include a data acquisition unit 901, a storage unit 902, and a calibration unit 903, and the like.

The data acquisition unit 901 may be configured to recognize a specific pattern received by the fisheye camera of the position sensor and a specific pattern received by the pinhole camera of the DSLR. The specific patterns refer to an upper ChArUco board pattern and a lower ChArUco board pattern of the dual-ChArUco board, respectively. In this case, the patterns used are determined based on predefined identification markers, the number of checker corner points, size, etc., as illustrated in FIGS. 5 and 7.

The storage unit 902 may be configured to store the images of the two sensors and the camera after confirming whether the position sensor and the DSLR camera recognize each pattern.

First, the calibration unit 903 may be configured to calculate the positional relationship $T_1$ from the position sensor to the ChArUco board pattern using the solvePnP( ) function through the stored large ChArUco board image.

Second, the calibration unit 903 checks the positional relationship $T_2$ between the large ChArUco board and the small ChArUco board of the dual-ChArUco board. Since $T_2$ is a fixed value known in advance, $T_2$ is stored in a memory for future use.

Third, the calibration unit 903 may be configured to calculate the positional relationship $T_3$ from the DSLR camera to the ChArUco board pattern using the solvePnP( ) function through the stored small ChArUco board image.

Fourth, the calibration unit 903 may be configured to calculate the positional relationship $T_0$ from the position sensor to the DSLR camera using the inverse matrix of $T_1$, $T_2$, and $T_3$, which are the resulting values of the steps performed above.

Meanwhile, the method of the present disclosure as described above may be created by a computer program. In addition, codes and code segments constituting the computer program may be easily inferred by a computer programmer skilled in the related art. Further, the created computer program is stored in a computer-readable recording medium (information storing medium) and is read and executed by a computer to implement the method according to an exemplary embodiment of the present disclosure. Further, the computer-readable recording medium includes all types of recording media that are readable by the computer.

More specifically, there is an advantage in that it is possible to provide the apparatus and method for more precisely performing the calibration between the heterogeneous sensors having a large difference in viewing angles.

At least some of the components described in the exemplary embodiments of the present disclosure may be implemented as hardware elements including at least one of a digital signal processor (DSP), a processor, a controller, an application-specific IC (ASIC), a programmable logic device (FPGA, etc.), and other electronic devices, or a combination thereof. In addition, at least some of the functions or processes described in the exemplary embodiments may be implemented as software, and the software may be stored in a recording medium. At least some components, functions, and processes described in the exemplary embodiments of the present disclosure may be implemented as a combination of hardware and software.

The methods according to exemplary embodiments of the present disclosure may be written as a program that may be executed on a computer and may be implemented as various recording media such as magnetic storage media, optical reading media, and digital storage media.

Various techniques described herein may be implemented as digital electronic circuitry, or in computer hardware, firmware, software, or combinations thereof. The implementations may be made as a computer program product, i.e., an information carrier, for example, a machine-readable storage device (computer-readable medium), for performing processing by, or for controlling, operations of a data processing apparatus, e.g., a programmable processor, a computer, or plurality of computers, and as a computer program tangibly embodied in a radio signal. A computer program, such as the computer program(s) described above, may be written in any form of programming language including compiled or interpreted languages, and may be deployed in any form including as a stand-alone program or as other units suitable for use in a module, a component, a subroutine, or computing environment. The computer program may be deployed to be processed on one computer or multiple computers at one site or distributed across multiple sites and interconnected by a communication network.

Processors suitable for processing a computer program include, by way of example, both general and special purpose microprocessors, and any one or more processors of any kind of digital computer. Generally, the processor will receive instructions and data from a read only memory or a random access memory or both. Elements of the computer may include at least one processor that executes instructions and one or more memory devices that store instructions and data. In general, the computer may include one or more mass storage devices, such as magnetic, magneto-optical disks, or optical disks, storing data, or may be coupled to receive data from these devices, transmit data to these devices, or transmit or receive data to and from these devices. Information carriers suitable for embodying computer program instructions and data include, for example, semiconductor memory devices such as magnetic media such as a hard disk, a floppy disk, and a magnetic tape, optical media such as a compact disk read only memory (CD-ROM) and a digital video disk (DVD), magneto-optical media such as a floptical disk, a read only memory (ROM), a random access memory (RAM), a flash memory, an erasable programmable ROM (EPROM), and an electrically erasable programmable ROM (EEPROM). The processor and memory may be supplemented by, or included in, special purpose logic circuitry.

The processor may execute an operating system and software applications executed on the operating system. In addition, the processor device may access, store, manipulate, process, and create data in response to execution of software. Although a case in which one processor device is used is described for convenience of understanding, it may be recognized by those skilled in the art that the processor device may include a plurality of processing elements and/or plural types of processing elements. For example, the processor device may include a plurality of processors or one processor and one controller. In addition, other processing configurations such as parallel processors are also possible.

In addition, non-transitory computer-readable media may be any usable media that may be accessed by a computer, and may include both computer storage media and transmission media.

While the present specification includes a plurality of specific implementations, these are not to be construed as limitations on the scope of any invention or claim, but should rather be understood as a description of features that may be specific to particular embodiments of particular inventions. Certain features that are described herein in the context of separate embodiments may be implemented in combination in a single embodiment. Conversely, various features that are described in the context of a single embodiment may also be implemented in multiple embodiments, either individually or in any suitable subcombination. Furthermore, although features operate in a particular combination and may be initially depicted and claimed as such, one or more features from a claimed combination may be excluded from the combination in some cases, and the claimed combination may be changed to a sub-combination or a variant of the sub-combination.

Likewise, while the drawings depict operations in a specific order, it is not to be understood that such operations should be performed in the specific order or sequential order shown or that all illustrated operations should be performed in order to obtain a desirable result. In certain cases, multitasking and parallel processing may be advantageous. Further, the separation of various device components of the above-described embodiments should not be construed as requiring such separation in all embodiments, and it should be understood that the program components and devices described may generally be integrated together into a single software product or packaged into multiple software products.

On the other hand, embodiments of the present invention presented in the present disclosure and drawings are merely presented to facilitate understanding by providing specific examples are not intended to limit the scope of the present invention. It will be apparent to one having ordinary skill in the art to which the present invention pertains that various other modifications based on the technical concept of the present invention are also possible in addition to the embodiments described herein.

Accordingly, one of ordinary skill would understand that the scope of the claimed invention is not to be limited by the above explicitly described embodiments but by the claims and equivalents thereof.

What is claimed is:

1. A method of calibration between wide angle-narrow angle lenses through a dual-ChArUco board, the method comprising:
   recognizing a first pattern through a wide-angle lens of a first sensor and recognizing a second pattern through a narrow-angle lens of a second sensor;
   storing the first pattern and the second pattern; and
   calibrating a positional relationship between the wide-angle lens and the narrow-angle lens using the stored first pattern and the stored second pattern,
   wherein the calibrating comprises:
   calculating a positional relationship $T_1$ from the first sensor to the first pattern;
   checking a fixed positional relationship $T_2$ of the first pattern and the second pattern;
   calculating a positional relationship $T_3$ from the second sensor to the second pattern; and
   calculating a positional relationship $T_0$ from the first sensor to the second sensor based on the $T_1$, the $T_2$, and the $T_3$,
   wherein the first sensor includes a sensor mounted on a position sensor camera, and
   the second sensor includes a sensor mounted on a digital single-lens reflex (DSLR) camera, and
   the recognizing comprises:
   recognizing the first pattern of the dual-ChArUco board from an image received through the position sensor camera; and
   recognizing the second pattern of the dual-ChArUco board from an image received through the DSLR camera.

2. The method of claim 1, wherein the storing comprises:
   checking whether the first pattern and the second pattern are suitable for each camera; and
   storing the first pattern and the second pattern simultaneously when it is determined that the first pattern and the second pattern are suitable for each camera.

3. The method of claim 1, wherein the dual-ChArUco board is a single calibration board comprising the first and second patterns, and the first and second patterns each include a combination of an ArUco marker and a checkerboard.

4. The method of claim 1, wherein the $T_1$ is calculated using a solvePnP( ) function in the image received through the position sensor camera.

5. The method of claim 1, wherein the $T_2$ is fixed as a constant value and pre-stored in a memory.

6. The method of claim 1, wherein the $T_3$ is calculated using the solvePnP( ) function in the image received through the DSLR camera, and an output value of the solvePnP( ) function uses an inverse matrix.

7. The method of claim 1, wherein the dual-ChArUco board distinguishes patterns of sizes optimized for the position sensor camera and the DSLR camera having different viewing angles.

8. The method of claim 1, wherein the first pattern and the second pattern are determined based on at least one of a predefined identification marker, the number of corner points, and a size.

9. An apparatus for calibration between wide angle-narrow angle lenses through a dual-ChArUco board, the apparatus comprising:
   a data acquisition unit configured to recognize a first pattern through a wide-angle lens of a first sensor and recognize a second pattern through a narrow-angle lens of a second sensor;
   a storage unit configured to store the first pattern and the second pattern; and
   a calibration unit configured to calibrate a positional relationship between the wide-angle lens and the narrow-angle lens using the stored first pattern and the stored second pattern,
   wherein the calibration unit is configured to calculate a positional relationship $T_1$ from the first sensor to the first pattern, check a fixed positional relationship $T_2$ between the first pattern and the second pattern, calculate a positional relationship $T_3$ from the second sensor to the second pattern, and calculate a positional relationship To from the first sensor to the second sensor based on the $T_1$, the $T_2$, and the $T_3$,
   wherein the first sensor includes a sensor mounted on a position sensor camera,
   the second sensor includes a sensor mounted on a digital single-lens reflex (DSLR) camera, and
   the data acquisition unit is configured to recognize the first pattern of the dual-ChArUco board from an image received through the position sensor camera and recognize the second pattern of the dual-ChArUco board from an image received through the DSLR camera.

10. The apparatus of claim 9, wherein the storage unit is configured to check whether the first pattern and the second pattern are patterns suitable for each camera, and when it is determined that the first pattern and the second pattern are suitable for each camera, store the first pattern and the second pattern simultaneously.

11. The apparatus of claim 9, wherein the dual-ChArUco board is a single calibration board comprising the first and second patterns, and the first and second patterns each include a combination of an ArUco marker and a checkerboard.

12. The apparatus of claim 9, wherein the Ti is calculated using a solvePnP( ) function in the image received through the position sensor camera.

13. The apparatus of claim 9, wherein the $T_2$ is fixed as a constant value and pre-stored in a memory.

14. The apparatus of claim 9, wherein the $T_3$ is calculated using the solvePnP( ) function in the image received through the DSLR camera, and an output value of the solvePnP( ) function uses an inverse matrix.

15. The apparatus of claim 9, wherein the dual-ChArUco board distinguishes patterns of sizes optimized for the position sensor camera and the DSLR camera having different viewing angles.

16. The apparatus of claim 9, wherein the first pattern and the second pattern are determined based on at least one of a predefined identification marker, the number of corner points, and a size.

\* \* \* \* \*